United States Patent
Clegg et al.

[11] Patent Number: 6,102,360
[45] Date of Patent: Aug. 15, 2000

[54] FACEPLATE ASSEMBLY WITH SELF-CONTAINED MOUNTING BRACKETS AND FASTENING HARDWARE

[75] Inventors: William Clegg, Allentown; Steven C. Thibault, Drexel Hill, both of Pa.

[73] Assignee: The Wiremold Company, West Hartford, Conn.

[21] Appl. No.: 09/132,070

[22] Filed: Aug. 17, 1998

[51] Int. Cl.[7] .............................. G12B 9/00; H01H 19/04; B65D 88/40
[52] U.S. Cl. .......................... 248/906; 248/27.1; 174/55; 220/3.6
[58] Field of Search ................... 248/27.1, 906; 174/66, 58, 48, 53, 52.1, 54, 55, 56, 57, 61, 63, 67; 220/3.6, 3.7, 3.9, 241; 439/538, 560

[56] References Cited

U.S. PATENT DOCUMENTS

| | | | |
|---|---|---|---|
| D. 360,876 | 8/1995 | Hughes | D13/177 |
| D. 384,646 | 10/1997 | Miller et al. | D13/170 |
| D. 390,774 | 2/1998 | Lutzker | D8/353 |
| 2,320,400 | 6/1943 | Bedell | 220/3.6 |
| 2,357,787 | 9/1944 | Windsheimer | 220/3.3 |
| 2,401,948 | 6/1946 | Loy | 174/53 |
| 3,852,513 | 12/1974 | Flahive | 174/55 |
| 3,966,152 | 6/1976 | Bromberg | 248/27 |
| 4,066,838 | 1/1978 | Fujita et al. | 174/48 |
| 4,076,364 | 2/1978 | Kuo | 339/103 |
| 4,304,957 | 12/1981 | Slater et al. | 174/65 |
| 4,830,316 | 5/1989 | Nehl | 248/27.1 |
| 5,064,386 | 11/1991 | Dale et al. | 439/535 |
| 5,221,814 | 6/1993 | Colbaugh et al. | 174/66 |
| 5,330,144 | 7/1994 | Stevenson et al. | 248/231.9 |
| 5,518,132 | 5/1996 | Chen | 220/3.8 |
| 5,595,362 | 1/1997 | Rinderer et al. | 248/27.1 |
| 5,623,124 | 4/1997 | Chien | 174/53 |
| 5,736,674 | 4/1998 | Gretz | 174/50 |

*Primary Examiner*—Anita M. King
*Assistant Examiner*—Michael Nornberg
*Attorney, Agent, or Firm*—McCormick, Paulding & Huber LLP

[57] ABSTRACT

A faceplate has self-contained fastening devices for securing it in a wall opening, and also has rearwardly projecting flanges and legs that are received in the wall. The flanges locate the faceplate relative to the opening and the legs serve to cooperate with the swinging fastener mounted arms to limit their rotation as the fastener is rotated to bring the arms into contact with the backside of the sheetrock wall structure.

5 Claims, 5 Drawing Sheets

FACEPLATE ASSEMBLY WITH SELF-CONTAINED MOUNTING BRACKETS AND FASTENING HARDWARE

FIELD OF THE INVENTION

This invention relates generally to fixtures of the type which are adapted to mounting in a wall opening, such as provided in a sheetrock structure where the fixture is recessed in the wall or mounted on the wall and a faceplate is provided for various connective devices, such as outlet plugs or telephone jacks or coaxial cable connectors, for example. More particularly, the present invention relates to a selfcontained mounting system for the faceplate itself rather than providing for separate faceplate and mounting brackets such as are presently offered, and must be combined for use by the installer.

SUMMARY OF THE INVENTION

In accordance with the present invention, a fixture is provided for insertion into a wall opening, as for example, an opening cut in a sheetrock wall, and the fixture comprises a faceplate which defines a front opening for receiving at least one and commonly several connective devices, such as telecommunication jacks and/or coaxially cable connectors. The faceplate includes a generally rectangular shaped outer frame that is adapted to overlie the wall around the wall opening. The backside of this outer frame defines integrally formed locator flanges that project rearwardly into the wall opening. A pair of mounting arms are movably provided in the backside of the faceplate for swinging movement between first positions where these arms provide clearance to permit the installer to place the device in the wall opening, and these arms are movably mounted on screw fasteners so that they can be swung through approximately 180° and used to clamp the faceplate in the wall opening.

Thus, the principal aim of the present invention is to provide a single subassembly which avoids the necessity for separate mounting brackets and fastening hardware to be used as a base for receiving a conventional faceplate assembly.

DETAILED DESCRIPTION OF THE PREFERRED EMBODIMENTS

The development of fixtures of the type which are especially adapted for low voltage applications has evolved to the point where the electrical devices or plugs are provided in a faceplate that is mounted to a separate subassembly that may comprise a mounting bracket and fastening hardware that allows the installer to first mount the bracket in a wall opening, typically a sheetrock wall, and later after installing the wiring, provide a faceplate with the appropriate plug or jack or cable connector hardware that is to be secured to the internal wiring within the wall, and finally, the installer secures the faceplate to the previously installed mounting bracket hardware.

The present invention seeks to avoid the need for separate mounting brackets and associated fastening hardware, and instead provides such structure in a unique faceplate assembly.

Figure 1:
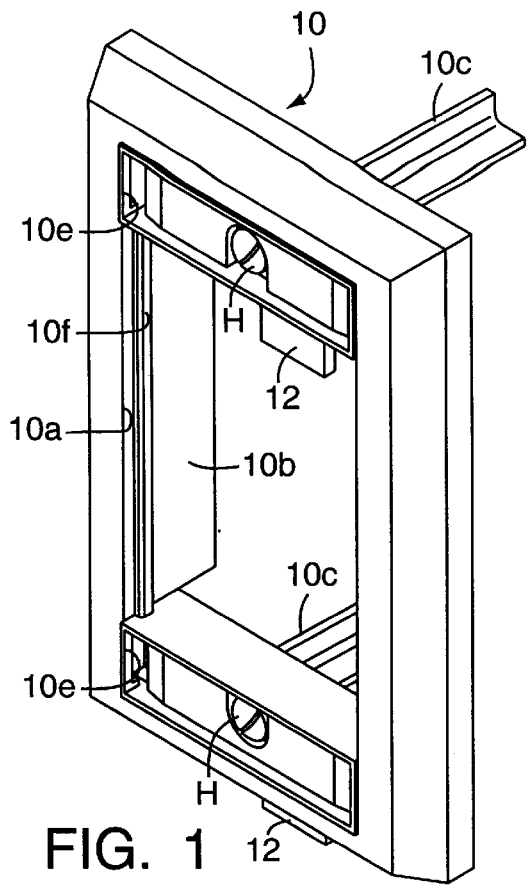
FIG. 1 is a top-front perspective view of a faceplate subassembly constructed in accordance with the present invention.
Figure 2:
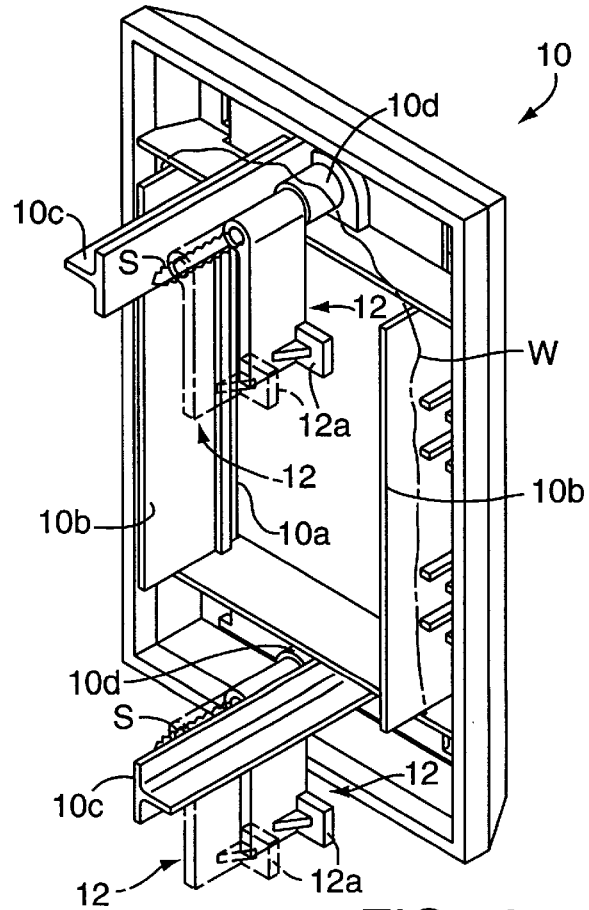
FIG. 2 is a rear top perspective view of the faceplate assembly of FIG. 1.

As shown in FIGS. 1 and 2, a faceplate 10 has a generally rectangular configuration typical of faceplates generally. However, the faceplate 10 defines a front opening 10a for receiving one or more conventional inserts that support connective devices, such as telecommunication jacks, coaxial cable connectors, or other plugs. However, the faceplate 10 further includes rearwardly projecting flanges 10b as well as rearwardly projecting legs 10c that cooperate to engage the opening provided in the sheetrock wall in order to locate the faceplate 10 in the wall opening without need for a previously installed mounting bracket and associated fastening devices.

The faceplate 10 includes a generally rectangular outer frame which is adapted to overlie the wall around a wall opening. The wall opening or more specifically, the wall structure defining the opening is indicated generally at W in FIGS. 2 and 3. Thus, the faceplate 10 has a frame portion surrounding this wall opening so that the backside of the faceplate abuts the outer surface of the wall structure as does a conventional faceplate. Unlike a conventional faceplate, however, the faceplate 10 can be seen to include rearwardly projecting flanges 10b and rearwardly projecting legs 10c that enter the wall opening W, and serve to position the faceplate in the wall structure as has been accomplished previously by separate mounting brackets and associated hardware.

In further accordance with the present invention, the faceplate 10 defines rearwardly projecting bosses 10d,10d provided alongside the rearwardly projecting legs 10c,10c. Each of these bosses 10d has a through opening which is adapted to slidably receive a screw fastener S (best shown in FIG. 2) so that the head H of the screw fastener S (best shown in FIG. 1) can be accessed by the installer for rotation of the screw fastener in its associated boss 10d of the faceplate 10.

Figure 3:
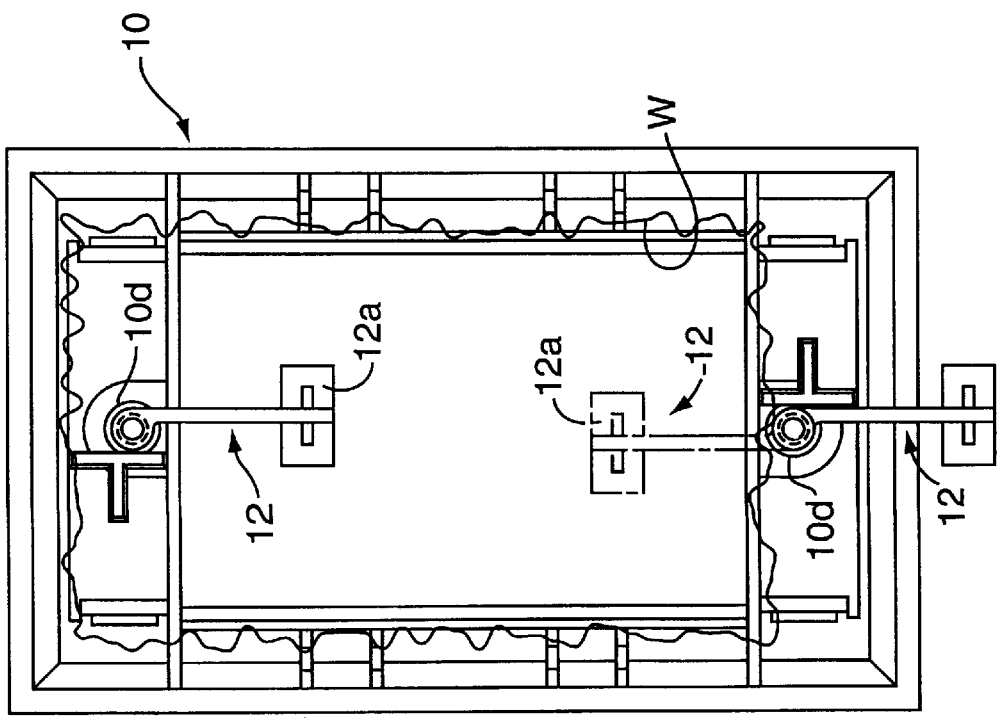
FIG. 3 is a rear view of the faceplate assembly of FIGS. 1 and 2, and illustrates the opening provided in the sheetrock where a device according to the present invention would be mounted.
Figure 4:
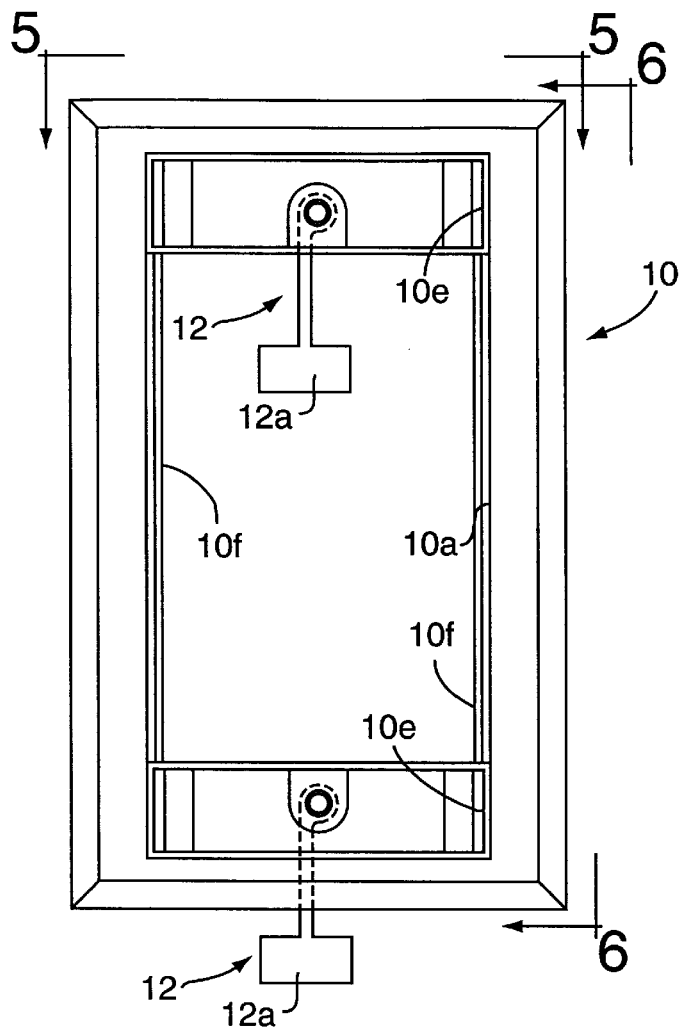
FIG. 4 is a front view of the assembly illustrated in FIGS. 1, 2 and 3.
Figure 5:
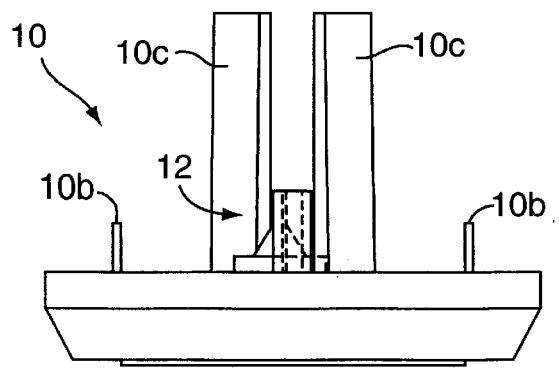
FIG. 5 is a view taken generally on line 5—5 of FIG. 4.
Figure 6:
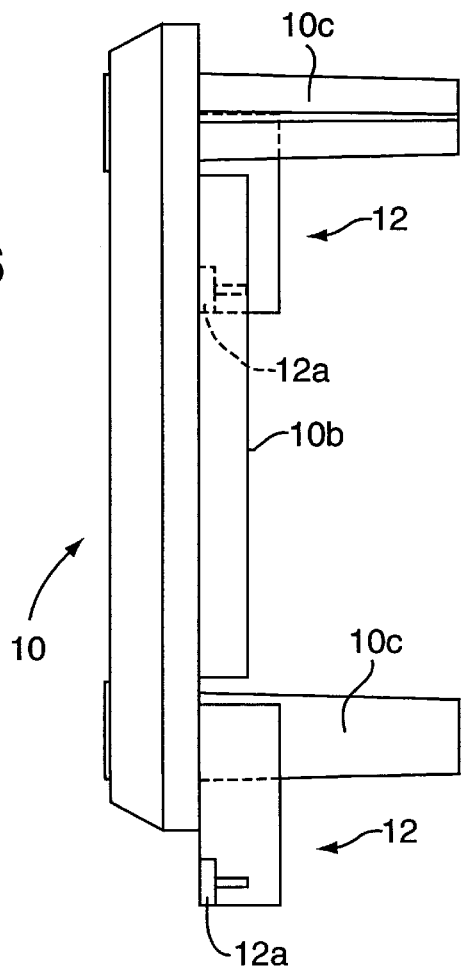
FIG. 6 is a view taken along line 6—6 of FIG. 4.

At least one mounting arm 12 is provided on each of the fasteners S,S associated with each of the bosses 10d, 10d so that each such arm is movably mounted relative to the faceplate and more particularly on the backside thereof, for swinging movement between first positions, such as that shown for the upper mounting arm 12 in FIGS. 2 and 3, to second positions, such as shown for the lower arm 12 of FIG. 3. This latter position for the arm 12 of FIG. 3 is achieved only after the faceplate assembly has itself been provided in the wall opening as a result of swinging the arm 12 to its second position as shown in FIG. 3. More particularly, this arm 12 must be unthreaded relative to fastener S so as to achieve a clearance spacing between the pad portion 12a of the leg and the inside surface of the sheetrock defining the wall opening W. At that point, the arm 12 can be rotated to the solid line position shown for it in FIG. 3 behind the sheetrock and clamped in place as a result of clock-wise tightening movement for the conventional threaded fastener S that supports it in this orientation.

Figure 9:
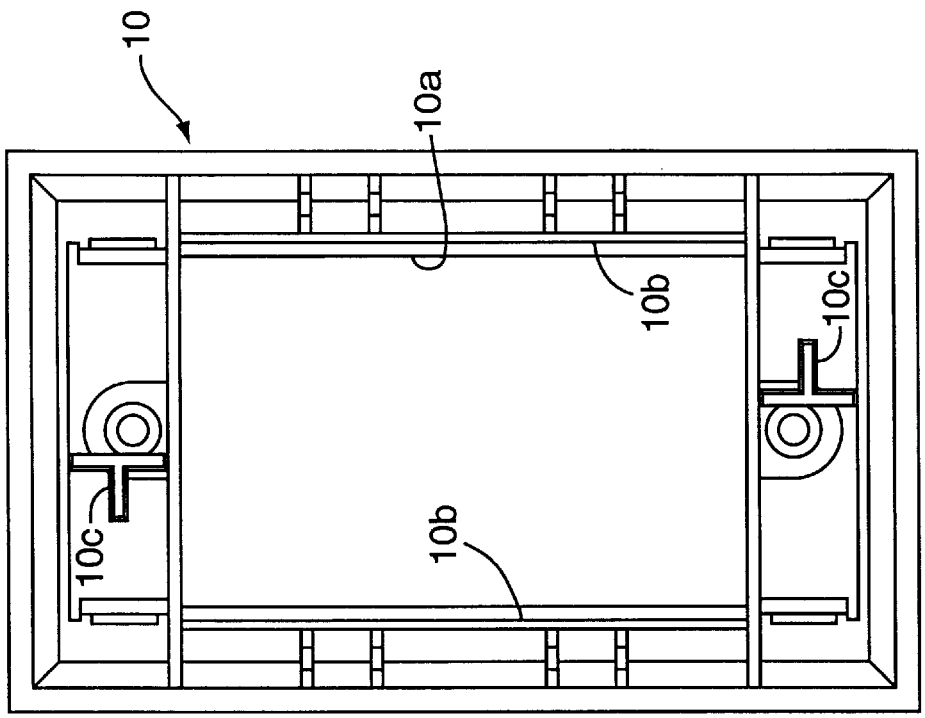
FIG. 9 is a rear view generally similar to FIG. 3 but again without the swinging arm bracket arrangement of FIGS. 1 through 6 inclusively.
Figure 8:
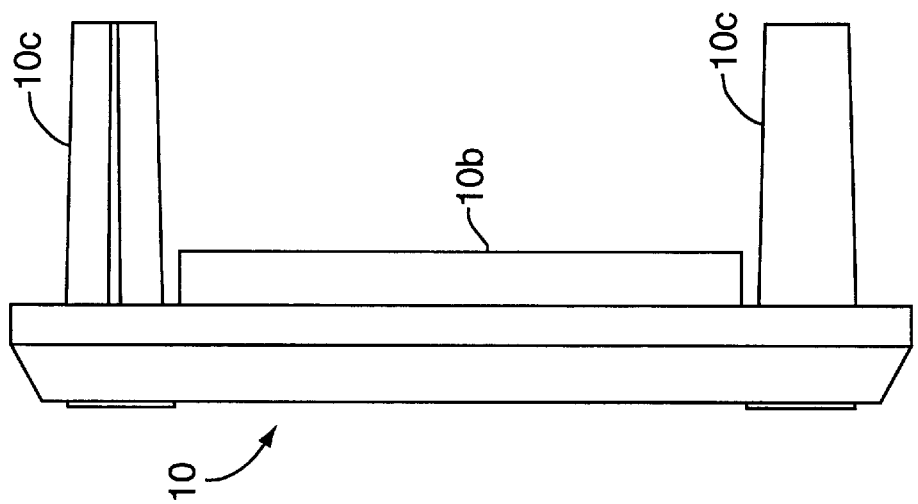
FIG. 8 is a view taken on line 8—8 of FIG. 7, being generally similar to FIG. 6, except that the swinging or mounting arms are not shown in FIG. 8.
Figure 7:
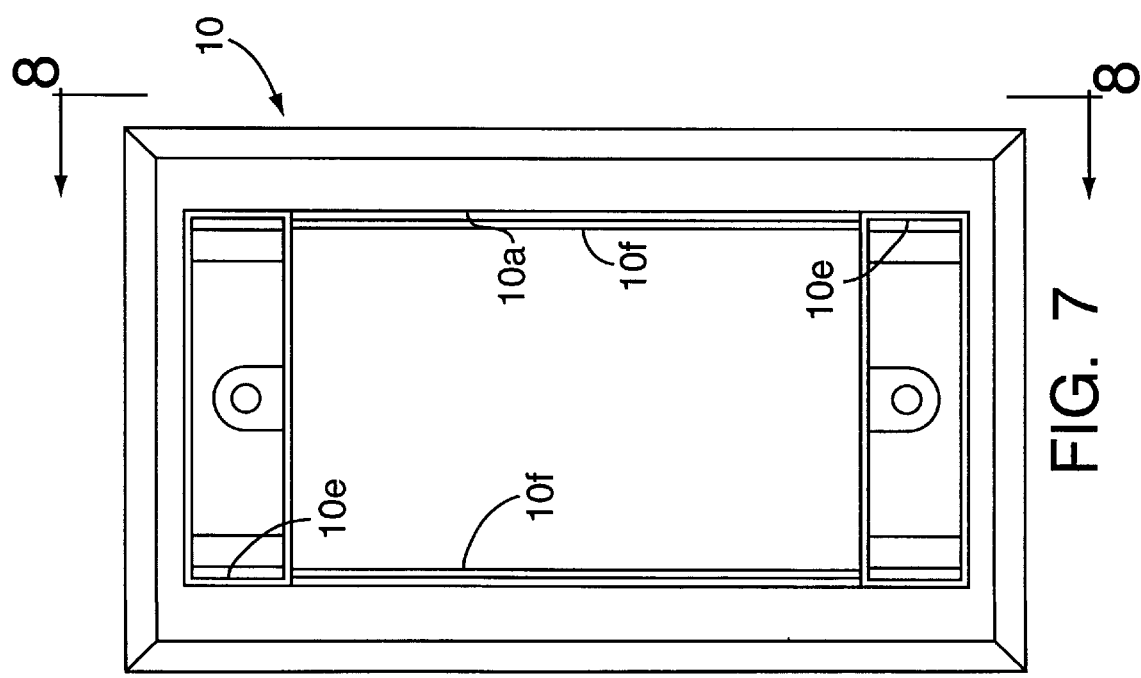
FIG. 7 is a view similar to FIG. 4, but without the mounting arms.

FIGS. 7, 8, and 9 illustrate the faceplate with its integrally formed, rearwardly projecting flanges and legs 10b and 10c respectively.

Figure 9A:
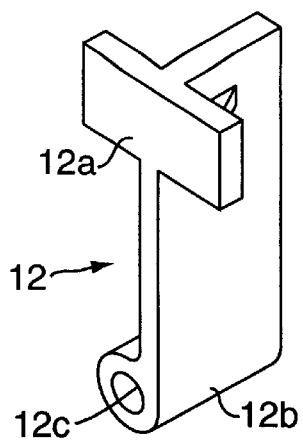
FIG. 9A is a perspective view of 1, one of the swinging arms illustrated in the faceplate assembly of FIGS. 1 through 6 inclusively.
Figure 10:
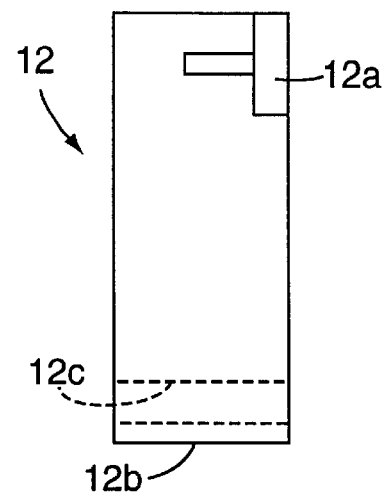
FIG. 10 is a side view of the arm illustrated in FIG. 9A.
Figure 11:
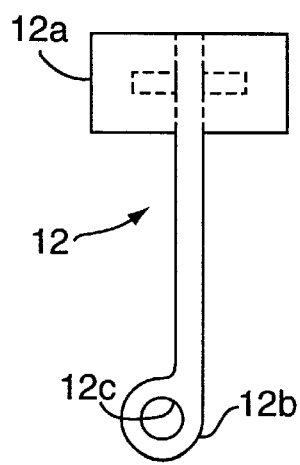
FIG. 11 is a front view of the arm illustrated in FIG. 9A.

FIGS. 9A, 10 and 11 illustrate the configuration of the swinging arms 12. Each arm 12 has a free end portion defining a pad 12a that is adapted to engage the backside of the sheetrock in the wall opening where the device of the present invention is to be mounted. More particularly, the arm 12 further includes a pivoted end portion 12b that defines an opening 12c which is configured to threadably receive the screw fastener S, and thereby provide for movement of the mounting arm 12 not only in the swinging motion described earlier, but also in the axial direction defined by the screw itself for purposes of positioning the arm 12 during mounting of the device of the present invention in a wall opening, and for clamping of the arm 12 against the backside of the sheetrock wall structure as described previously. An important feature of the present feature can be attributed to the fact that the screw fasteners S,S which anchor the faceplate of the invention in the wall opening are accessible from the front of the faceplate as a result of each of the screw fasteners S being readily accessed by the installer (See FIG. 1 and the Head H of each of the screws S, all as referred to previously).

Figure 12:
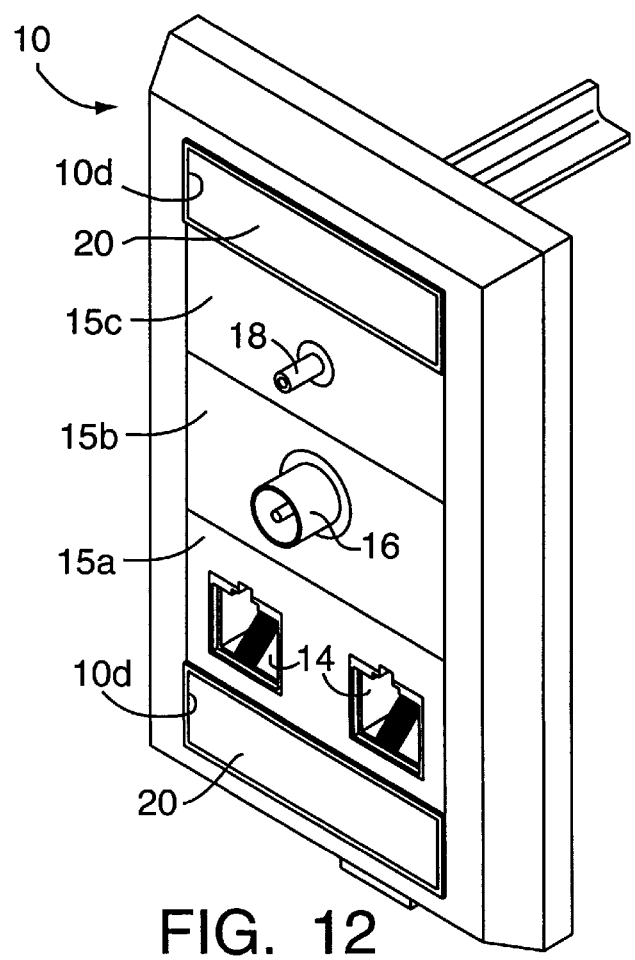
FIG. 12 shows the faceplate assembly of FIGS. 1–9 with three connective devices provided in the faceplate assembly.

As a result of this unique fixture or faceplate assembly, the installer can quickly and easily provide the faceplate assembly with any derived combination of low voltage electrical connection devices 15a, 15b, 15c, as suggested in FIG. 12. These devices include telephone jacks 14, coaxial cable connectors 16 and audio style input/output jacks 18. Inserts or covers 20,20 are provided in the rectangular recesses 10d,10d provided at opposite ends of the frame opening itself to cover the screw heads H,H of the fasteners S,S. Each device 15a, 15b and 15c has resilient wings (not shown) for engaging ribs 10e,10e provided on the longer sides of the frame opening 10a as best shown in FIG. 1.

Various modifications of the structure illustrated in the drawings and described above will be apparent to those skilled in the art. For example, the rearwardly projecting flanges 10b may be of different configuration, and may or may not be provided on the long sides of the rectangular faceplate illustrated. Where, for example, faceplates of different configuration are to be provided for, it will be apparent that these rearwardly projecting flanges 10b will also be of different geometry.

The depth of the rearwardly projecting legs 10c of the faceplate 10 is such as to assure sufficient axial movement for the mounting arm 12 on its associated screw fastener S. Each leg affords an abutment against which the arms can act during the process of tightening the screw S and thereby drawing the pad 12a against the rear face of the sheetrock. Thus, the maximum thickness of the sheetrock encountered by the installer determines the depth to which the legs 10c must extend in order to serve their intended function.

While preferred embodiments have been shown and described, various modifications and substitutions may be made without departing from the spirit and scope of the invention. Accordingly, it is to be understood that the present invention has been described by way of example, and not by limitation.

What is claimed is:

1. A faceplate for insertion into a wall opening and comprising:

said faceplate having a generally polygon shape with an outer frame, the backside of which outer frame is adapted to overlie the wall around the wall opening;

said outer frame consisting of a single rectangular through-opening, for receiving at least one connective device wherein said through-opening has no obstructions;

said faceplate having rearwardly projecting flanges for extending inwardly into the wall opening, wherein said frame and said flanges are unitarily formed as a one-piece member and wherein said flanges extend inwardly from the outer perimeter of said rectangular through-opening located on said backside of said outer frame;

two arms movably mounted in said faceplate frame for swinging movement between a first portion where the arms are disposed for entering the wall opening, and a second position where the arms are adapted to engage the wall for securing the faceplate in the wall opening;

said faceplate further including two integrally defined rearwardly projecting legs that extend rearwardly from said faceplate backside, and said two arms being rotatably mounted for swinging movement on axes oriented adjacent to and parallel said legs respectively, whereby said arms are limited in their swinging movement to an arc of approximately 180 degrees; and two threaded fasteners, each of said fasteners having a head portion accessible from the front side of said faceplate whereby rotation of the fastener provides for said swinging movement of said arms.

2. The faceplate according to claim 1, wherein said faceplate backside defines a boss for rotatably receiving each of said two fasteners.

3. The faceplate according to claim 2, wherein each of said two arms is threadably received on one of said two fasteners.

4. The faceplate according to claim 1, wherein said faceplate front opening is generally rectangular with recesses for said fasteners adjacent the end portions of said rectangular opening, and said rectangular opening side edges having ribs for engaging several such connecting devices adapted to be secured in said opening.

5. An assembly according to claim 4, further including covers for said opening end portions.

* * * * *